(12) United States Patent
Hwang

(10) Patent No.: US 12,126,090 B2
(45) Date of Patent: *Oct. 22, 2024

(54) SATELLITE ANTENNA POSITIONER HAVING PREDICTIVE MAINTENANCE FUNCTION

(71) Applicant: GTL Co., Ltd., Changwon-si (KR)

(72) Inventor: Geon Ho Hwang, Changwon-si (KR)

(73) Assignee: GTL Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/563,871

(22) PCT Filed: Jul. 12, 2022

(86) PCT No.: PCT/KR2022/010162
§ 371 (c)(1),
(2) Date: Nov. 22, 2023

(87) PCT Pub. No.: WO2023/120848
PCT Pub. Date: Jun. 29, 2023

(65) Prior Publication Data
US 2024/0266727 A1     Aug. 8, 2024

(30) Foreign Application Priority Data
Dec. 23, 2021   (KR) .................. 10-2021-0186182

(51) Int. Cl.
*H01Q 3/08*   (2006.01)
*H01Q 1/00*   (2006.01)
(Continued)

(52) U.S. Cl.
CPC ............... *H01Q 3/08* (2013.01); *H01Q 1/005* (2013.01); *H01Q 1/18* (2013.01); *G06N 3/09* (2023.01)

(58) Field of Classification Search
CPC . H01Q 1/125–1264; H01Q 3/08; H01Q 1/005
See application file for complete search history.

(56) References Cited

U.S. PATENT DOCUMENTS 3,987,452 A * 10/1976 Godet ................... H01Q 3/08
343/765
4,953,422 A *  9/1990 Chapman ............... H01Q 3/08
248/661
(Continued)

FOREIGN PATENT DOCUMENTS

CN    109586003 A  *  4/2019   .......... H01Q 1/1207
CN    110625439 A  * 12/2019
(Continued)

OTHER PUBLICATIONS

International Search Report for PCT/KR2022/010162 mailed Oct. 21, 2022.
(Continued)

*Primary Examiner* — Ab Salam Alkassim, Jr.
(74) *Attorney, Agent, or Firm* — Renaissance IP Law Group LLP

(57) ABSTRACT

A satellite antenna positioner having a predictive maintenance function, according to an embodiment of the present inventive concept, relates to a satellite antenna positioner having a predictive maintenance function, which supports an antenna and is configured to orient the antenna on the basis of a received satellite signal, the satellite antenna positioner comprising: a first motor which generates driving power for adjusting the elevation of the antenna; a first gear which rotates the antenna about a first axis while reducing the rotation speed of the first motor; a second motor which generates driving power for adjusting the azimuth of the antenna; a second gear which rotates the antenna about a second axis perpendicular to the first axis while reducing the rotation speed of the second motor; a control module which (Continued)

controls the first motor and the second motor on the basis of the sensitivity of the received satellite signal; and a predictive maintenance module which monitors whether at least one of the first gear and the second gear is abnormal.

10 Claims, 9 Drawing Sheets

(51) Int. Cl.
  *H01Q 1/18* (2006.01)
  *G06N 3/09* (2023.01)

(56) References Cited

U.S. PATENT DOCUMENTS

| | | | | |
|---|---|---|---|---|
| 5,281,975 | A * | 1/1994 | Hugo | H01Q 1/125 |
| | | | | 343/882 |
| 5,764,185 | A * | 6/1998 | Fukushima | H01Q 3/04 |
| | | | | 342/359 |
| 6,313,805 | B1 * | 11/2001 | Nishiyama | H01Q 3/04 |
| | | | | 343/882 |
| 10,615,484 | B2 | 4/2020 | Elford et al. | |
| 2003/0112194 | A1 * | 6/2003 | Watson | H01Q 3/02 |
| | | | | 343/757 |
| 2004/0227655 | A1 * | 11/2004 | King | H01Q 1/3275 |
| | | | | 341/176 |
| 2007/0103366 | A1 * | 5/2007 | Park | H01Q 3/08 |
| | | | | 342/359 |
| 2009/0231224 | A1 * | 9/2009 | Felstead | H01Q 3/08 |
| | | | | 343/882 |
| 2010/0253586 | A1 * | 10/2010 | Tippit | H01Q 1/125 |
| | | | | 343/757 |
| 2010/0259458 | A1 * | 10/2010 | Mattis | H01Q 3/08 |
| | | | | 343/766 |
| 2013/0321225 | A1 * | 12/2013 | Pettus | H01Q 1/18 |
| | | | | 343/765 |
| 2017/0025752 | A1 * | 1/2017 | Zimmerman | H01Q 3/08 |
| 2020/0287280 | A1 * | 9/2020 | Huang | H01Q 1/246 |
| 2021/0057798 | A1 * | 2/2021 | Zimmerman | H01Q 3/08 |

FOREIGN PATENT DOCUMENTS

| | | | |
|---|---|---|---|
| JP | H05284052 | | 10/1993 |
| JP | H06141579 A | | 5/1994 |
| JP | H09199924 A | | 7/1997 |
| JP | 2007129624 A | * | 5/2007 |
| KR | 20090081628 A | | 7/2009 |
| KR | 101846541 B1 | | 4/2018 |

OTHER PUBLICATIONS

European Extended Search Report for Application No. 22911488.9, mailed Jul. 9, 2024.

Orbit Communication Systems Ltd.: "Enhanced AL-7106—2.2m (87") C-Band Linear Marine Stabilized Antenna System for 2-Way Communications", Installation and Operations Manual—Orbit AL-7107, Jan. 1, 2011, XP055493718.

* cited by examiner

A-A

B-B

SATELLITE ANTENNA POSITIONER HAVING PREDICTIVE MAINTENANCE FUNCTION

TECHNICAL FIELD

The present inventive concept relates to a satellite antenna positioner, and specifically, to a satellite antenna positioner having a predictive maintenance function.

BACKGROUND ART

Low Earth Orbit (LEO) satellite communication refers to a system that allows mobile communication through a satellite moving at an altitude of 200 to 2,000 km.

Low earth orbit satellites may provide global ICT service by expanding coverage through the operation of a plurality of low earth orbit constellation satellites using the characteristics of transmission delay lower than that of geostationary satellites.

Owing to the advantages of global network configuration, existing and new global companies have entered into full-scale competition for realizing Internet services based on small constellation satellites on the basis of enormous investment capital, and the role of low earth orbit small satellites in the communication field is expected to be considered important.

Since the low earth orbit satellites have a high moving speed and a low altitude compared to those of geostationary satellites, and the coverage area of one satellite is small, the number of satellites needed to provide communication services around the world should be at least 500.

These low earth orbit satellites rotate around the Earth about 15 times a day at an altitude of 200 to 1,500 km at a speed of 7.5 km/s, and as the time for passing through the Korean Peninsula is about 10 minutes, an antenna positioner is needed to precisely control an antenna to be positioned in a direction the same as that of the satellite within a short period of time.

Meanwhile, since satellite antennas are generally exposed to the outside, the possibility of damage due to external environmental factors such as wind or the like should always be considered. In particular, in a harsh environment such as in a polar region or the like, there is a problem in that maintenance cost due to damage to the antenna positioner may be generated excessively.

DISCLOSURE OF INVENTIVE CONCEPT

Technical Problem

An object of the satellite antenna positioner having a predictive maintenance function according to an embodiment of the present inventive concept is to solve the following problems in order to solve the problems described above.

An object of the present inventive concept is to provide a satellite antenna positioner having a predictive maintenance function, which can monitor the state of a driving unit inside the satellite antenna positioner in real time and grasp in advance the possibility of damage to the driving unit such as a gear or the like.

The problems to be solved by the present inventive concept are not limited to those mentioned above, and unmentioned other problems may be clearly understood by those skilled in the art from the following description.

Technical Solution

To accomplish the above objects, according to one aspect of the present inventive concept, there is provided a satellite antenna positioner having a predictive maintenance function, which is configured to support an antenna and orient the antenna on the basis of a satellite reception signal, the positioner comprising: a first motor for generating a driving force for adjusting an elevation angle of the antenna; a first gear for reducing a rotation speed of the first motor and rotating the antenna around a first axis; a second motor for generating a driving force for adjusting an azimuth angle of the antenna; a second gear for reducing a rotation speed of the second motor and rotating the antenna around a second axis perpendicular to the first axis; a control module for controlling the first motor and the second motor on the basis of sensitivity of the satellite reception signal; and a predictive maintenance module for monitoring whether at least one among the first gear and the second gear is abnormal.

It is preferable that the predictive maintenance module detects whether a specific area of at least one among the first gear and the second gear is abnormal.

It is preferable that the predictive maintenance module calculates a rotation angle of the first gear, which is a range of rotation when the first motor rotates once, on the basis of a gear reduction ratio of the first gear, and determines whether there is an abnormality at a specific rotation angle of the first gear on the basis of a result of comparing at least any one among an input current of the first motor, an output current of the first motor, and a vibration pattern of the first gear with first reference information set in advance.

It is preferable that the first reference information is determined through machine learning based on a deep learning algorithm in which a correlation between an input parameter and an output parameter is defined, and the input parameter is at least one among the input current and the output current of the first motor, and the vibration pattern of the first gear, and the output parameter is information on damage at a specific rotation angle of the first gear.

It is preferable that the predictive maintenance module calculates a rotation angle of the second gear, which is a range of rotation when the second motor rotates once, on the basis of a gear reduction ratio of the second gear, and determines whether there is an abnormality at a specific rotation angle of the second gear on the basis of a result of comparing at least any one among an input current of the second motor, an output current of the second motor, and a vibration pattern of the second gear with second reference information set in advance.

It is preferable that the second reference information is determined through machine learning based on a deep learning algorithm in which a correlation between an input parameter and an output parameter is defined, and the input parameter is at least one among the input current and the output current of the second motor, and the vibration pattern of the second gear, and the output parameter is information on damage at a specific rotation angle of the second gear.

It is preferable that the satellite antenna positioner further comprises a wind direction and wind speed sensor for detecting a direction and speed of wind blowing into the antenna, wherein the predictive maintenance module calculates a wind pressure load applied to an antenna reflector on the basis of detection information of the wind direction and wind speed sensor, and generates a warning signal on the basis of the calculated wind pressure load.

It is preferable that the predictive maintenance module stores a look-up table or a formula that defines a first wind speed limit at every angle between a front surface of the antenna reflector and a wind direction, and generates the warning signal when a wind exceeding the first wind speed limit blows into the front surface of the antenna reflector.

It is preferable that the predictive maintenance module generates the warning signal when a wind exceeding the first wind speed limit is predicted to blow into the front surface of the antenna reflector in consideration of a rotation direction of the antenna determined by the control module.

It is preferable that the predictive maintenance module generates a driving stop signal for stopping rotation of the antenna when a wind exceeding the first wind speed limit is predicted to blow into the front surface of the antenna reflector in consideration of a rotation direction of the antenna reflector determined by the control module.

It is preferable that when a wind exceeding a second wind speed limit blows into the front surface of the antenna reflector, the predictive maintenance module generates a posture stabilization signal, and the control module controls the first motor and the second motor so that the front surface of the antenna reflector may be in parallel with the wind direction on the basis of the posture stabilization signal, and the second wind speed limit is greater than the first wind speed limit.

It is preferable that the predictive maintenance module includes a communication unit for communicating with external devices.

It is preferable that the predictive maintenance module is configured to be attached to and detached from the satellite antenna positioner.

It is preferable that the satellite antenna positioner further comprises a camera module for photographing at least one among the first gear and the second gear.

Advantageous Effects

The satellite antenna positioner having a predictive maintenance function according to an embodiment of the present inventive concept has an effect of grasping in advance the possibility of damage to a specific area of a gear on the basis of at least one among the current of a motor provided therein and the vibration pattern of the gear.

In addition, as the criteria for determining the possibility of damage to a gear are determined through machine learning using big data secured in advance, an effect of creating accurate determination criteria can be expected.

The effects of the present inventive concept are not limited to those mentioned above, and unmentioned other effects may be clearly understood by those skilled in the art from the following description.

BEST MODE FOR CARRYING OUT THE INVENTIVE CONCEPT

Figure 1:
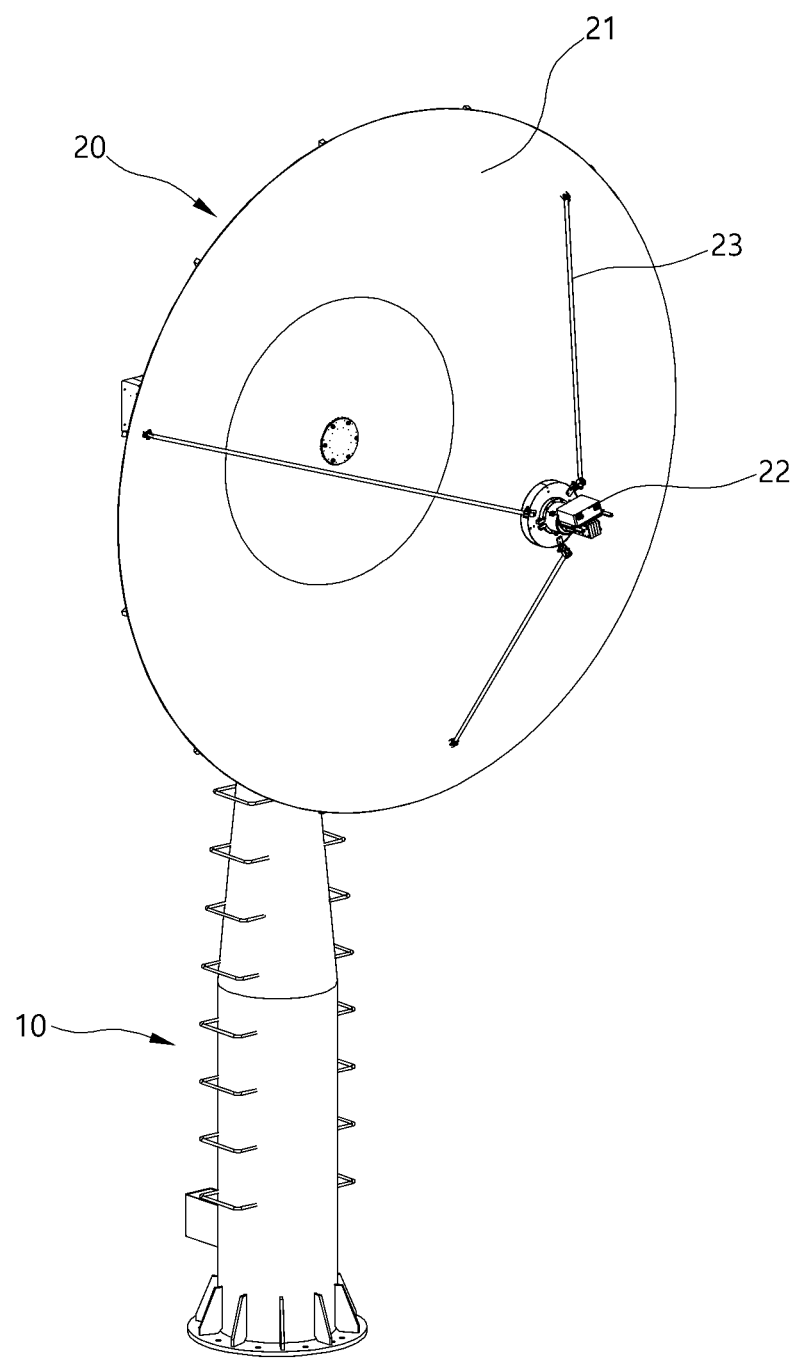
FIGS. 1 and 2 are perspective views showing a satellite antenna positioner having a predictive maintenance function according to an embodiment of the present inventive concept.

Preferred embodiments according to the present inventive concept will be described in detail with reference to the accompanying drawings, and the same reference numerals will be assigned to identical or similar components regardless of reference symbols, and duplicate description thereof will be omitted.

In addition, when it is determined in describing the present inventive concept that the detailed description of related known techniques may obscure the gist of the present inventive concept, the detailed description will be omitted. In addition, it should be noted that the accompanying drawings are only intended to facilitate easy understanding of the spirit of the present inventive concept, and should not be construed as limiting the spirit of the present inventive concept by the attached drawings.

Hereinafter, a satellite antenna positioner having a predictive maintenance function according to an embodiment of the present inventive concept will be described with reference to FIGS. 1 to 8.

Figure 2:
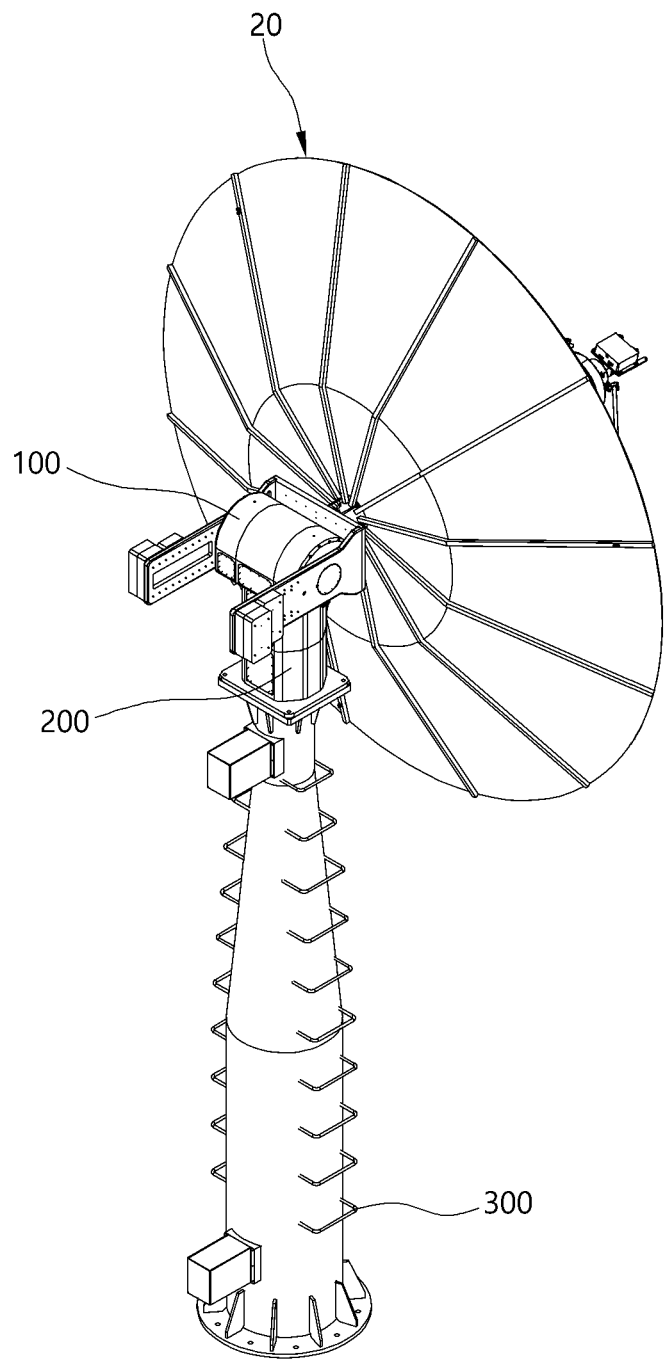

The satellite antenna positioner having a predictive maintenance function according to an embodiment of the present inventive concept is configured to support an antenna 20 as shown in FIGS. 1 and 2 and orient the antenna 20 on the basis of satellite reception signals.

The antenna 20 is specifically configured to include a reflector 21, a feeder 22, and a tripod 23, and the satellite antenna positioner 10 supports the antenna 20 and rotates the antenna 20 so that the antenna 20 may track a satellite.

In order to perform this function, the satellite antenna positioner 10 is configured to include an elevation angle adjustment member 100, an azimuth angle adjustment member 200, a support member 300, and a control module 400 as shown in FIG. 2.

Figure 3:
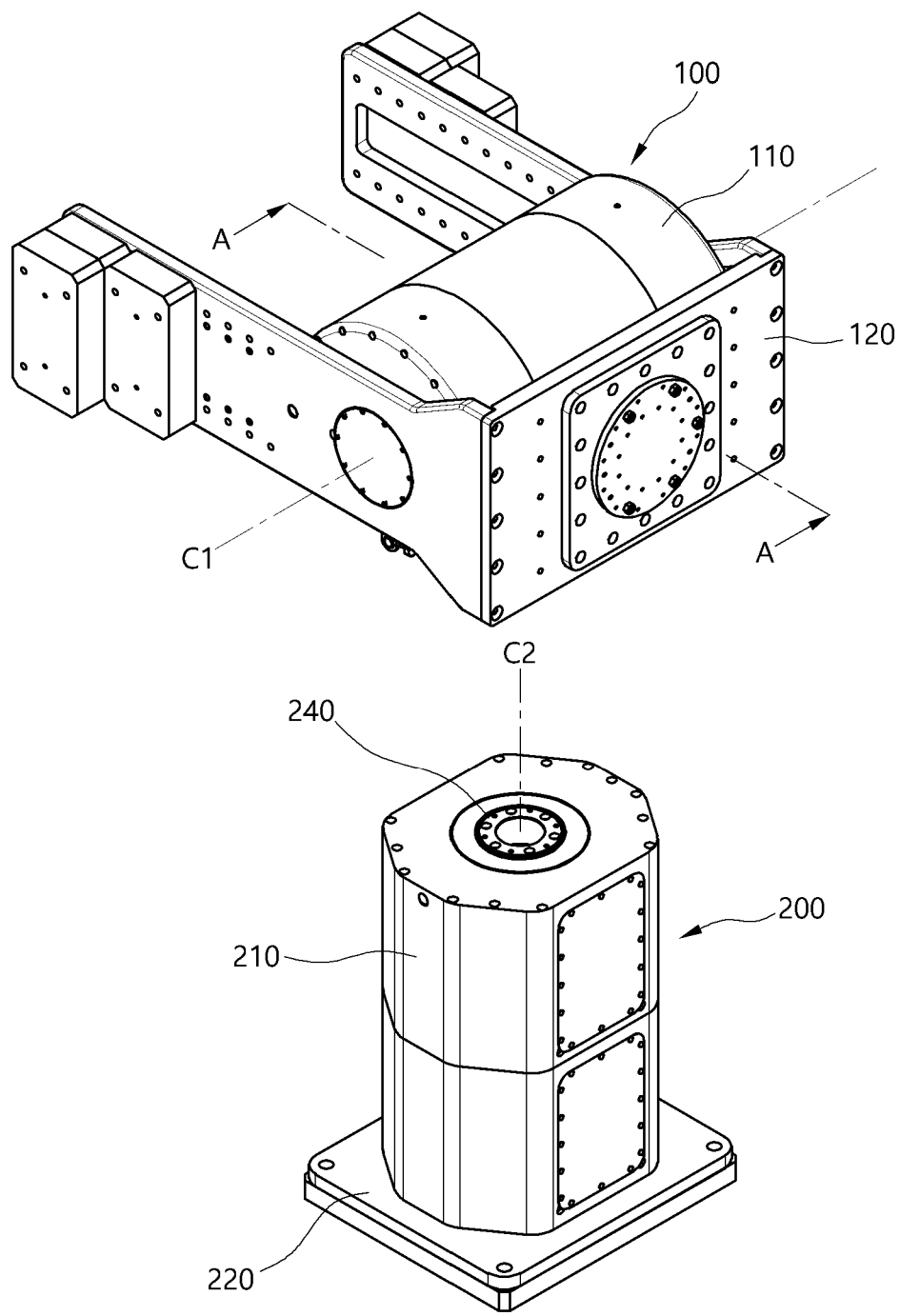
FIGS. 3 and 4 are perspective views showing an elevation angle adjustment member and an azimuth angle adjustment member of a satellite antenna positioner having a predictive maintenance function according to an embodiment of the present inventive concept.
Figure 5:
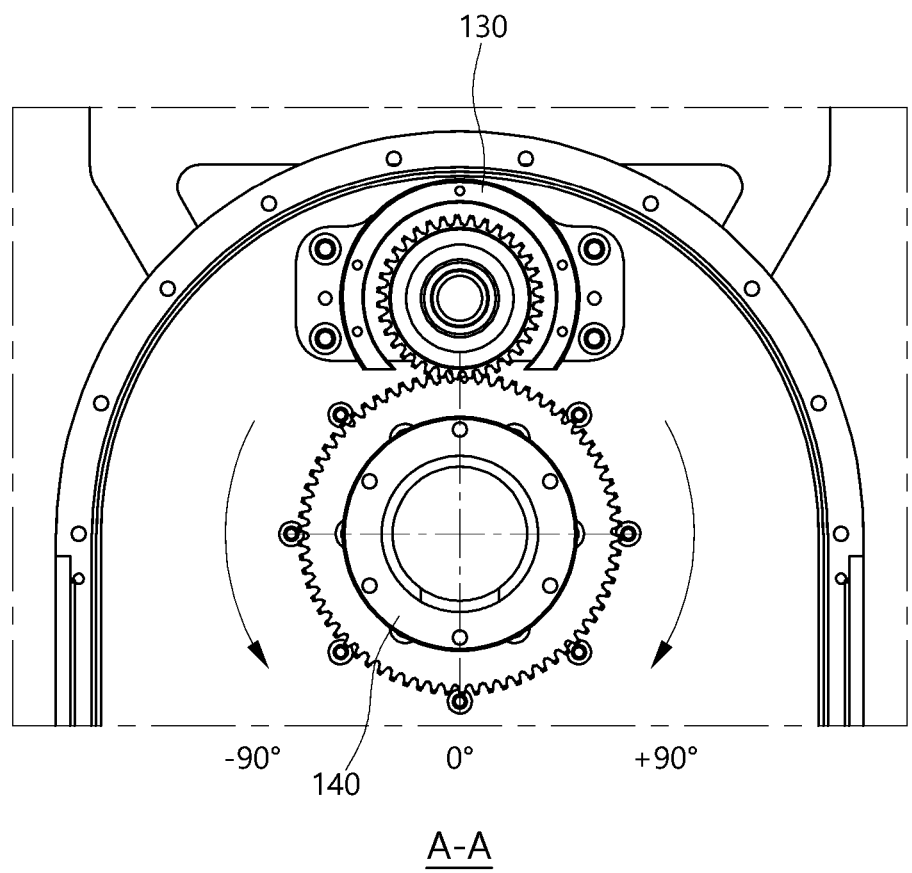
FIG. 5 is a cross-sectional view taken along the line A-A in FIG. 3.

The elevation angle adjustment member 100 is a configuration for adjusting the elevation angle of the antenna 20, and is configured of a first housing 110, a rotating member 120, a first motor 130, and a first gear 140 as shown in FIGS. 3 and 5.

The first housing 110 is a configuration for accommodating the first motor 130 and the first gear 140, and the rotating member 120 is a configuration rotatably coupled to both side surfaces of the first housing 110, and the rotating member 120 is configured such that the backside of the antenna reflector 21 is coupled to the front side and both side surfaces are rotatably coupled to both side surfaces of the first housing 110.

The first motor 130 is a configuration for generating a driving force for adjusting the elevation angle of the antenna 20, and the first gear 140 performs a function of reducing the rotation speed of the first motor 130 and rotating the antenna 20 around a first axis C1.

The first gear 140 may be formed of a plurality of gears, and specifically, may be configured of a driving gear configured to be directly connected to the output shaft of the first motor 130 to reduce the rotation speed of the first motor 130, and a driven gear formed to be engaged with the driving gear, and one side and the other side of the shaft connected to the driven gear are fixedly coupled to the rotating member 120.

As a result, when the first motor 130 rotates, the first gear 140 rotates on the basis of a preset gear reduction ratio, and the antenna 20 rotates on the basis of the rotation of the first gear 140, and thus the elevation angle of the antenna 20 can be adjusted.

Figure 4:
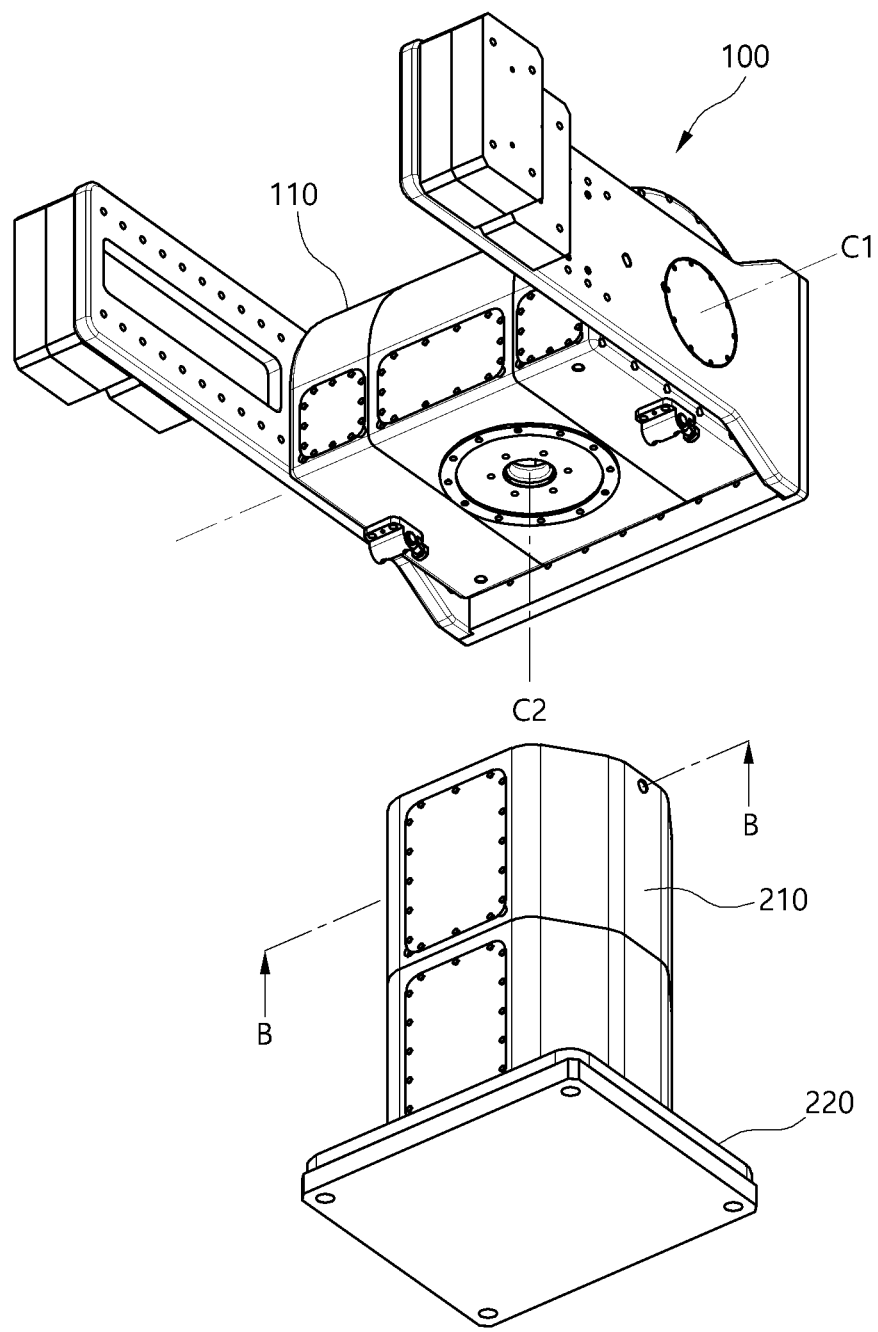
Figure 6:
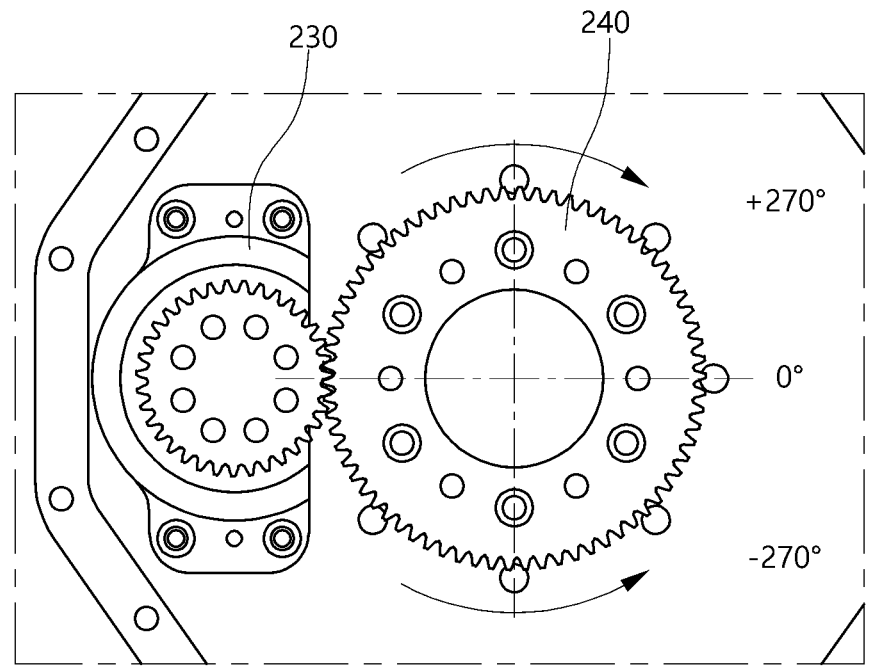
FIG. 6 is a cross-sectional view taken along the line B-B in FIG. 4.

The azimuth angle adjustment member 200 is a configuration for adjusting the azimuth angle of the antenna 20, and is configured of a second housing 210, a fixing member 220, a second motor 230, and a second gear 240 as shown in FIGS. 4 and 6.

The second housing 210 is a configuration for accommodating the second motor 230 and the second gear 240, and the fixing member 220 is a configuration coupled to the top surface of the support member 300 to fix the antenna positioner 10 to the ground.

The second motor 230 is a configuration for generating a driving force for adjusting the azimuth angle of the antenna 20, and the second gear 240 performs a function of reducing the rotation speed of the second motor 230 and rotating the antenna 20 around a second axis C2.

The second gear 240 may be formed of a plurality of gears, and specifically, may be configured of a driving gear configured to be directly connected to the output shaft of the second motor 230 to reduce the rotation speed of the second motor 230, and a driven gear formed to be engaged with the driving gear, and the driven gear is configured to be fixedly coupled to the bottom of the elevation angle adjustment member 100.

As a result, when the second motor 230 rotates, the second gear 240 rotates on the basis of a preset gear reduction ratio, and the elevation angle adjustment member 100 and the antenna 20 rotate around the second axis on the basis of the rotation of the second gear 240, and thus the azimuth angle of the antenna 20 can be adjusted.

The support member 300 is a configuration fixedly coupled to the bottom of the azimuth angle adjustment member 200 as described above, and is a configuration for fixing the antenna positioner 10 to the ground.

Figure 7:
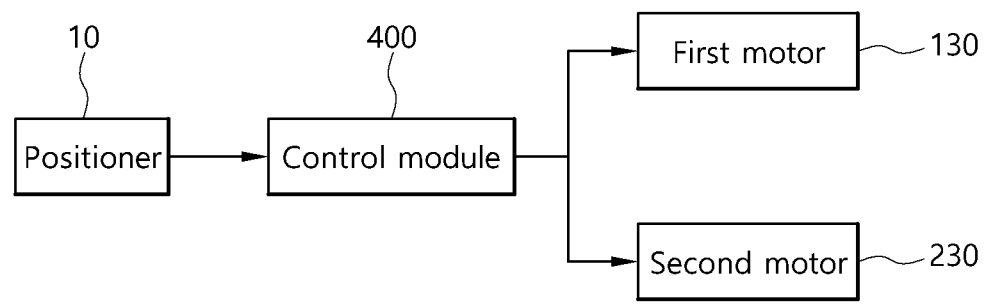
FIG. 7 is a block diagram for explaining the function of the control module of a satellite antenna positioner having a predictive maintenance function according to an embodiment of the present inventive concept.

As shown in FIG. 7, the control module 400 performs a function of controlling adjustment of the elevation angle and azimuth angle of the antenna 20 by controlling the first motor 130 and the second motor 230 on the basis of the sensitivity of satellite reception signals.

Figure 8:
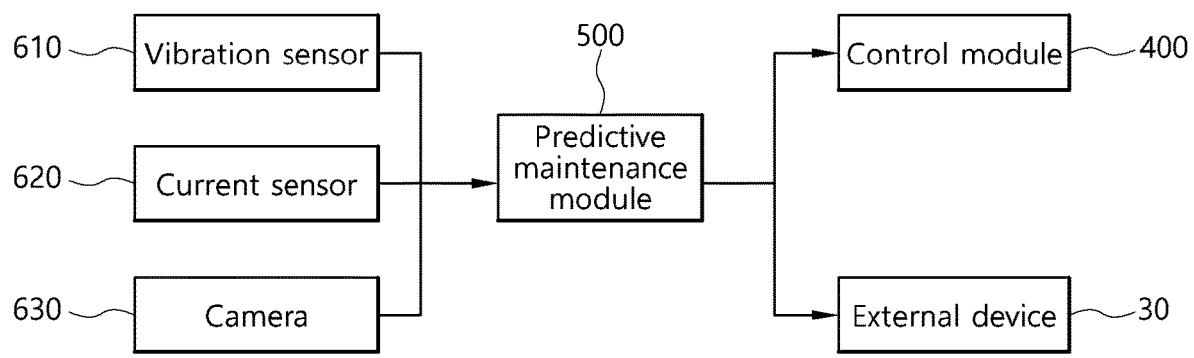
FIG. 8 is a block diagram for explaining the function of the predictive maintenance module of a satellite antenna positioner having a predictive maintenance function according to an embodiment of the present inventive concept.

Meanwhile, as shown in FIG. 8, the satellite antenna positioner according to an embodiment of the present inventive concept further includes a predictive maintenance module 500 for monitoring whether at least one among the first gear 140 and the second gear 240 provided inside the satellite antenna positioner 10 is abnormal.

Specifically, the predictive maintenance module 500 is configured to detect whether there is an abnormality in a specific area of the first gear 140 or whether there is an abnormality in a specific area of the second gear 240.

For example, the first gear 140 for adjusting the elevation angle of the antenna 20 is configured to rotate within an angle of −90 to +90 degrees around a reference angle as shown in FIG. 5, and when an abnormal signal occurs while the antenna 20 rotates passing through a specific elevation angle, an abnormality may be detected in an area of the first gear 140 corresponding to the specific elevation angle, or the possibility of generating a failure in the future may be predicted in advance.

In addition, the second gear 240 for adjusting the azimuth angle of the antenna 20 is configured to rotate within an angle of −270 to +270 degrees around a reference angle as shown in FIG. 6, and when an abnormal signal occurs while the antenna 20 rotates passing through a specific azimuth angle, an abnormality may be detected in an area of the second gear 240 corresponding to the specific elevation angle, or the possibility of generating a failure in the future may be predicted in advance.

Here, the abnormal signal may be an amount of change in the input current and the output current of the first motor 130 and the second motor 230, or a vibration pattern when the first gear 140 and the second gear 240 rotate once, and to this end, the satellite antenna positioner 10 may be provided with a current sensor 620, a vibration sensor 610, and the like as shown in FIG. 8.

That is, the predictive maintenance module 500 is configured to confirm whether a specific area of the first gear 140 and the second gear 240 is abnormal on the basis of the abnormal signal acquired from any one among the current sensor 620 and the vibration sensor 610, generate a warning message, and transmit the warning message to an external device 30 or the control module 400.

Meanwhile, as described above, in order to specify a specific area where there is an abnormality such as damage, a crack, or the like in the first gear 140 and the second gear 240, the predictive maintenance module 500 calculates the rotation angle of the first gear 140, which is a range of rotation when the first motor 130 rotates once, on the basis of the gear reduction ratio of the first gear 140, and calculates the rotation angle of the second gear 240, which is a range of rotation when the second motor 230 rotates once, in the same manner on the basis of the gear reduction ratio of the second gear 240.

Through this, the predictive maintenance module 500 determines whether there is an abnormality at a specific rotation angle of the first gear 140 on the basis of a result of comparing at least any one among the input current and the output current of the first motor 130 and the vibration pattern of the first gear 140 with first reference information set in advance.

In the same manner, the predictive maintenance module 500 determines whether there is an abnormality at a specific rotation angle of the second gear 240 on the basis of a result of comparing at least any one among the input current and the output current of the second motor 230 and the vibration pattern of the second gear 240 with second reference information set in advance.

Although the first and second reference information described above may be set in advance by the user, in order to ensure reliability and accuracy, the first reference information and the second reference information are preferably determined through machine learning based on a deep learning algorithm in which a correlation between an input parameter and an output parameter is defined.

Here, the input parameter may be any one among the input current and the output current of the first motor 130 and the second motor 230, and the vibration pattern of the first gear 140 and the second gear 240, and the output parameter is preferably information on damage at a specific rotation angle of the first gear 140 and the second gear 240.

The input parameter and the output parameter corresponding to each input parameter described above are included in the big data secured in advance, and the big data may be secured through the process of operating the satellite antenna positioner, a test performed before the operation, or the like.

Meanwhile, although the current sensor 620, the vibration sensor 610, and the like may be provided as described above to detect an abnormal signal, a camera module 630 capable of photographing the driving states of the first gear 140 and the second gear 240 in real time may be provided.

At this point, considering that the camera module 630 should be accommodated inside the first housing 110 and the second housing 210, the camera module 630 should be formed small.

When the predictive maintenance module 500 determines that there is an abnormality in a specific area of the first gear 140 or the second gear 240, it may generate and transmit a warning signal to the external device 30 such as a PC, a tablet computer, or a smartphone, and to this end, it is preferable that the predictive maintenance module 500 is provided with a separate communication unit.

In addition, the predictive maintenance module 500 may transfer the warning signal to the control module 400, and the control module 400 may control the first motor 130 and the second motor 140 in consideration of the abnormal situation of the first gear 140 or the second gear 240 determined by the predictive maintenance module 500.

For example, when it is determined that the problem of the first gear 140 or the second gear 240 is serious, the control module 400 may stop operation of the first motor 130 or the second motor 140, and furthermore, when it is determined that a minor problem has occurred in the first gear 140, the control module 400 may perform a control such as instantaneously increasing the output of the first motor 130 in order to quickly avoid a situation of applying a load at a specific rotation angle of the first gear 140, which generates a problem when the elevation angle of the antenna 10 is adjusted, or temporarily driving the second motor 140 at a specific time point to instantaneously distribute the load.

Figure 9:
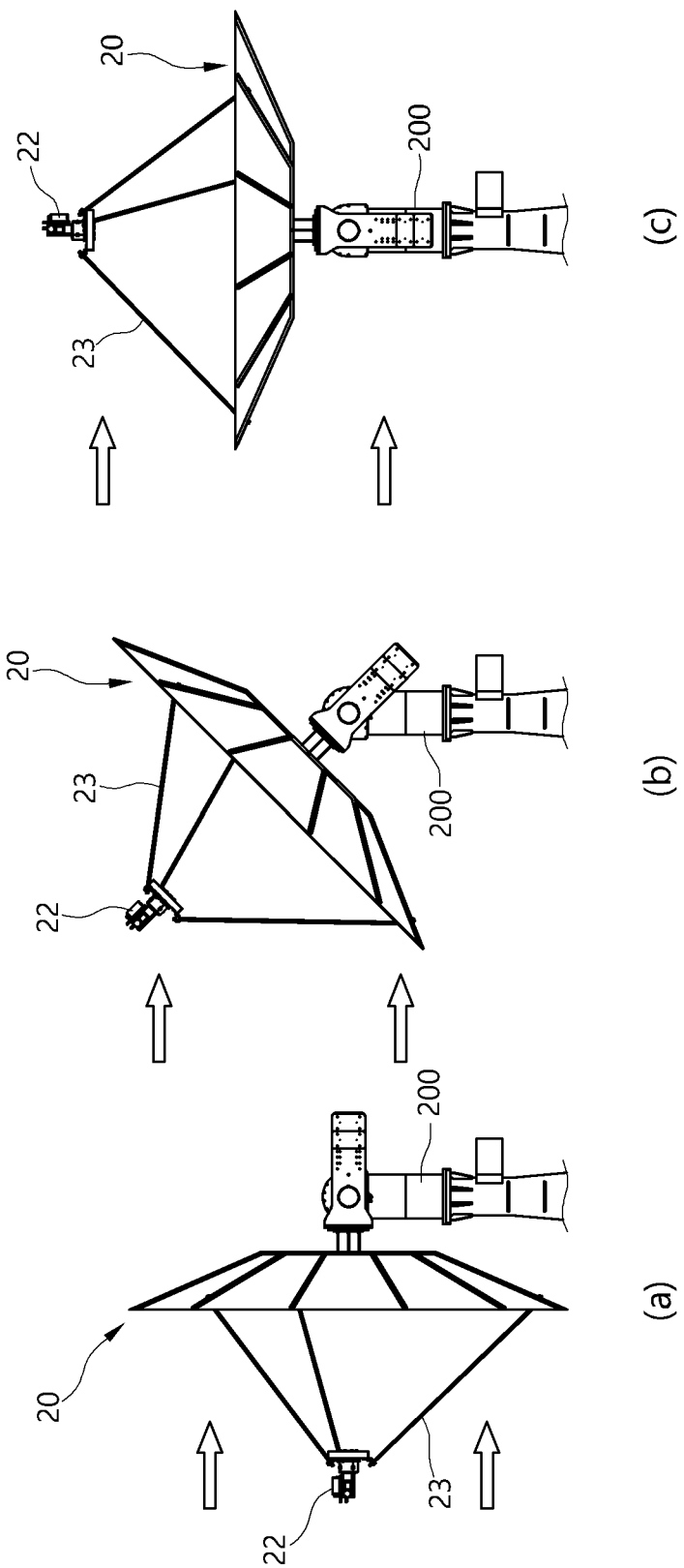
FIG. 9 is a view for explaining the effect of wind pressure according to the elevation angle of an antenna.
Figure 10:
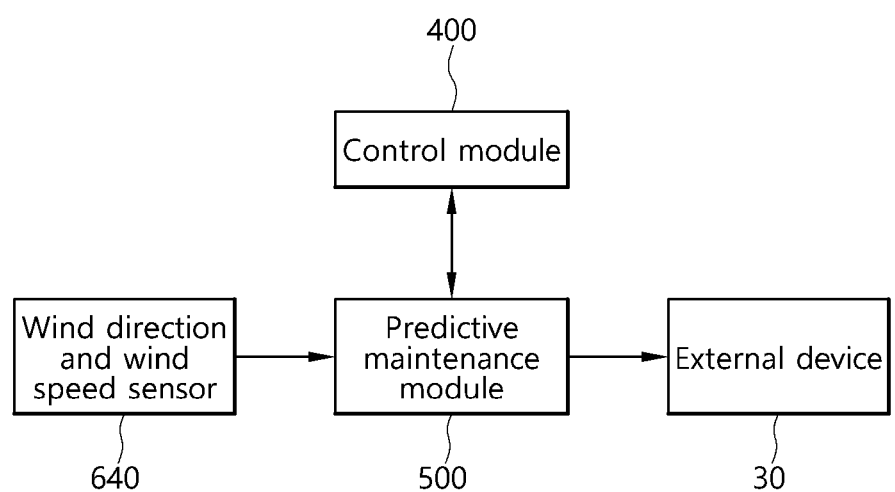
FIG. 10 is a block diagram for explaining the function of the predictive maintenance module of a satellite antenna positioner having a predictive maintenance function according to another embodiment of the present inventive concept.

Hereinafter, a satellite antenna positioner having a predictive maintenance function according to another embodiment of the present inventive concept will be described with reference to FIGS. 9 and 10.

Generally, a satellite antenna 20 installed outside may be affected by external weather environments, and particularly, when a strong wind blows toward the satellite antenna 20, excessive wind pressure is applied to the antenna reflector 21.

As a result, excessive load may be applied to the driving system of the antenna positioner 10 in the satellite tracking process of the antenna 20, and furthermore, it may cause damage to the antenna reflector 21 and the driving system of the antenna positioner 10.

Although the satellite antenna positioner having a predictive maintenance function according to another embodiment of the present inventive concept includes the configuration of the satellite antenna positioner having a predictive maintenance function according to an embodiment of the present inventive concept described above, in order to prevent the problems described above, it is configured to further include a wind direction and wind speed sensor 640 for detecting the direction and speed of wind blowing into the antenna 20.

At this point, the predictive maintenance module 500 is configured to calculate a wind pressure load applied to the antenna reflector 21 on the basis of the detection information of the wind direction and wind speed sensor 640, and generate a warning signal on the basis of the calculated wind pressure load.

Meanwhile, the wind pressure applied to the antenna reflector 21 varies according to the angle between the front surface of the antenna reflector 21 and the wind direction, and the wind pressure applied to the antenna reflector 21 is the greatest when the front surface of the antenna reflector 21 is perpendicular to the wind direction as shown in FIG. 9(a), and on the contrary, the wind pressure applied to the antenna reflector 21 is the smallest when the front surface of the antenna reflector 21 is in parallel with the wind direction as shown in FIG. 9(c).

In order to reflect this, the predictive maintenance module 500 stores a look-up table or a formula that defines a first wind speed limit at every angle between the front surface of the antenna reflector 21 and the wind direction, and the predictive maintenance module 500 is configured to generate a warning signal when a wind exceeding the first wind speed limit blows into the front surface of the antenna reflector 21.

The predictive maintenance module 500 may transmit the warning signal to the external device 30 through the communication unit, and may also generate and transmit a driving stop signal to the control module 400.

Particularly, considering that the wind direction and the wind speed change in real time, and the antenna 20 also rotates according to the movement of a satellite, the predictive maintenance module 500 may generate and transfer a warning signal and a driving stop signal to the control module 400 when a wind exceeding the first wind speed limit is predicted to blow into the front surface of the antenna reflector 21 in consideration of the rotation direction of the antenna 20 determined by the control module 400.

In addition, when a wind exceeding a second wind speed limit blows into the front surface of the antenna reflector 21, and the predictive maintenance module 500 generates and transfers a posture stabilization signal to the control module 400, the control module 400 controls the first motor 130 and the second motor 230 so that the front surface of the antenna reflector 21 may be in parallel with the wind direction as shown in FIG. 9(c) on the basis of the posture stabilization signal, and here, the second wind speed limit is set to be greater than the first wind speed limit.

Meanwhile, although the predictive maintenance module 500 described above may be integrally formed inside the antenna positioner like the control module 400, the predictive maintenance module 500 may be configured as separate hardware to be attached to and detached from the satellite antenna positioner 10.

Although the present inventive concept has been described in detail using preferred embodiments, the scope of the present inventive concept is not limited to the specific embodiments and should be interpreted by the appended claims. In addition, those skilled in the art should understand that many changes and modifications are possible without departing from the scope of the present inventive concept.

The invention claimed is:

1. A satellite antenna positioner having a predictive maintenance function, which is configured to support an antenna and orient the antenna on the basis of a satellite reception signal, the positioner comprising:
   a first motor for generating a driving force for adjusting an elevation angle of the antenna;
   a first gear for reducing a rotation speed of the first motor and rotating the antenna around a first axis;

a second motor for generating a driving force for adjusting an azimuth angle of the antenna;

a second gear for reducing a rotation speed of the second motor and rotating the antenna around a second axis perpendicular to the first axis;

a control module for controlling the first motor and the second motor on the basis of sensitivity of the satellite reception signal; and a predictive maintenance module for monitoring whether at least one among the first gear and the second gear is abnormal, wherein the predictive maintenance module calculates a rotation angle of the first gear, which is a range of rotation when the first motor rotates once, on the basis of a gear reduction ratio of the first gear, and determines whether there is an abnormality at a specific rotation angle of the first gear on the basis of a result of comparing at least any one among an input current of the first motor, an output current of the first motor, and a vibration pattern of the first gear with first reference information set in advance, wherein the first reference information is determined through machine learning based on a deep learning algorithm in which a correlation between an input parameter and an output parameter is defined, wherein the input parameter is at least one among the input current and the output current of the first motor, and the vibration pattern of the first gear, and the output parameter is information on damage at a specific rotation angle of the first gear.

2. The positioner according to claim 1, further comprising a wind direction and wind speed sensor for detecting a direction and speed of wind blowing into the antenna, wherein the predictive maintenance module calculates a wind pressure load applied to an antenna reflector on the basis of detection information of the wind direction and wind speed sensor, and generates a warning signal on the basis of the calculated wind pressure load.

3. The positioner according to claim 2, wherein the predictive maintenance module stores a look-up table or a formula that defines a first wind speed limit at every angle between a front surface of the antenna reflector and a wind direction, and generates the warning signal when a wind exceeding the first wind speed limit blows into the front surface of the antenna reflector.

4. The positioner according to claim 3, wherein the predictive maintenance module generates the warning signal when a wind exceeding the first wind speed limit is predicted to blow into the front surface of the antenna reflector in consideration of a rotation direction of the antenna determined by the control module.

5. The positioner according to claim 3, wherein the predictive maintenance module generates a driving stop signal for stopping rotation of the antenna when a wind exceeding the first wind speed limit is predicted to blow into the front surface of the antenna reflector in consideration of a rotation direction of the antenna reflector determined by the control module.

6. The positioner according to claim 3, wherein when a wind exceeding a second wind speed limit blows into the front surface of the antenna reflector, the predictive maintenance module generates a posture stabilization signal, and the control module controls the first motor and the second motor so that the front surface of the antenna reflector may be in parallel with the wind direction on the basis of the posture stabilization signal, and the second wind speed limit is greater than the first wind speed limit.

7. The positioner according to claim 1, wherein the predictive maintenance module includes a communication unit for communicating with external devices.

8. The positioner according to claim 1, wherein the predictive maintenance module is configured to be attached to and detached from the satellite antenna positioner.

9. The positioner according to claim 1, further comprising a camera module for photographing at least one among the first gear and the second gear.

10. A satellite antenna positioner having a predictive maintenance function, which is configured to support an antenna and orient the antenna on the basis of a satellite reception signal, the positioner comprising:

a first motor for generating a driving force for adjusting an elevation angle of the antenna;

a first gear for reducing a rotation speed of the first motor and rotating the antenna around a first axis;

a second motor for generating a driving force for adjusting an azimuth angle of the antenna;

a second gear for reducing a rotation speed of the second motor and rotating the antenna around a second axis perpendicular to the first axis;

a control module for controlling the first motor and the second motor on the basis of sensitivity of the satellite reception signal; and a predictive maintenance module for monitoring whether at least one among the first gear and the second gear is abnormal, wherein the predictive maintenance module calculates a rotation angle of the second gear, which is a range of rotation when the second motor rotates once, on the basis of a gear reduction ratio of the second gear, and determines whether there is an abnormality at a specific rotation angle of the second gear on the basis of a result of comparing at least any one among an input current of the second motor, an output current of the second motor, and a vibration pattern of the second gear with second reference information set in advance, wherein the second reference information is determined through machine learning based on a deep learning algorithm in which a correlation between an input parameter and an output parameter is defined, wherein the input parameter is at least one among the input current and the output current of the second motor, and the vibration pattern of the second gear, and the output parameter is information on damage at a specific rotation angle of the second gear.

* * * * *